United States Patent [19]

Kaarlela

[11] 4,116,689

[45] Sep. 26, 1978

[54] MATERIAL AND METHOD FOR SECURING BORON FILAMENTS TO EACH OTHER AND TO A SUBSTRATE AND CUTTING TOOLS THEREFROM

[75] Inventor: William Thomas Kaarlela, Fort Worth, Tex.

[73] Assignee: General Dynamics Corporation, Fort Worth, Tex.

[21] Appl. No.: 644,005

[22] Filed: Dec. 24, 1975

[51] Int. Cl.$^2$ .............................................. C22C 1/09
[52] U.S. Cl. .................................. 75/229; 29/419 R; 75/154; 75/164; 75/DIG. 1; 75/200; 75/201; 75/247; 228/121; 428/539.5; 428/549; 428/568; 428/605
[58] Field of Search .............. 29/182.2, 182.3, 419 R; 75/200, 154, 164, DIG. 1, 229, 201, 247; 228/121; 428/539.5, 549, 568, 605

[56] References Cited

U.S. PATENT DOCUMENTS

| 2,828,197 | 3/1958 | Blackmer | 428/568 |
|---|---|---|---|
| 3,017,268 | 1/1962 | Saarivirtu | 75/164 X |
| 3,203,775 | 8/1965 | Cantrell | 75/247 X |
| 3,218,697 | 11/1965 | Wainer | 75/DIG. 1 X |
| 3,305,324 | 2/1967 | Krock et al. | 75/247 X |
| 3,653,882 | 4/1972 | Petrasek et al. | 75/DIG. 1 X |
| 3,668,748 | 6/1972 | Divecha et al. | 29/419 |
| 3,691,623 | 9/1972 | Staudhammer et al. | 29/419 X |
| 3,889,348 | 6/1975 | Lemelson | 75/229 X |
| 3,902,864 | 9/1975 | Nix et al. | 428/539.5 X |
| 3,994,722 | 11/1976 | Kaarlela et al. | 75/DIG. 1 X |
| 4,009,027 | 2/1977 | Naidich et al. | 75/154 |

OTHER PUBLICATIONS

Davis et al., "Metal and Ceramic Matrix Composites" pp. 75-79, Cahners Pub. Co. 1970.
Kizikov, E. D. et al. Chem. Abs. #79:117912, 1973.
Kizikov, E. D. et al. Chem. Abs. #81:139689, 1974.
Kizikov, E. D. et al. Chem. Abs. #82:128280, 1975.
Samsonov, G. V. Chem. Abs. #83:167,889, 1974.

*Primary Examiner*—Richard E. Schafer
*Attorney, Agent, or Firm*—Charles E. Schurman

[57] ABSTRACT

Material and method for securely attaching boron filaments to other like filaments and to a substrate with preservation of the filament integrity for cutting and abrading by coating them with a mixture of matrix metals essentially containing copper, tin and titanium and joining the filaments by the matrix metals and/or to the substrate into an integral structure by liquid-phase-sintering of the matrix metals which grip and adhere the filaments in a strong, tough alloy with the integrity of the filaments essentially preserved. Boron-filament-containing tools for cutting, grinding, abrading, or the like may be fabricated using the materials of the invention and the methods disclosed.

10 Claims, 10 Drawing Figures

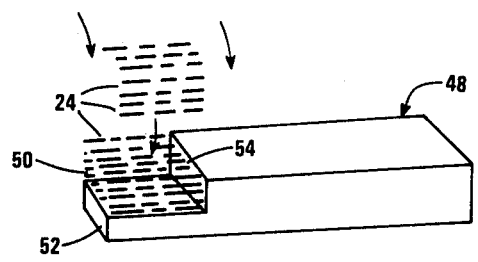
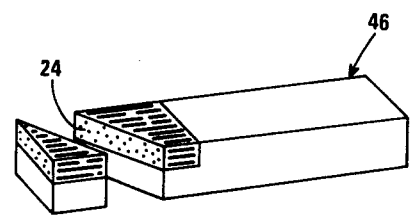
FIG. 6  FIG. 7
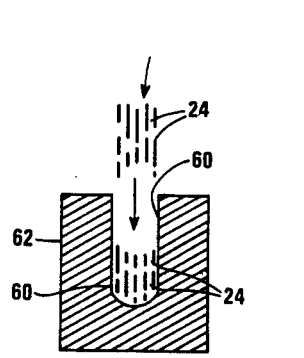
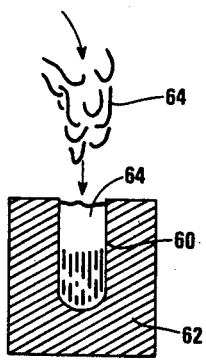
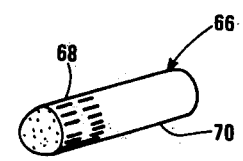
FIG. 8  FIG. 9  FIG. 10

MATERIAL AND METHOD FOR SECURING BORON FILAMENTS TO EACH OTHER AND TO A SUBSTRATE AND CUTTING TOOLS THEREFROM

The invention herein described was made in the course of or under a contract or subcontract thereunder with the Department of the Air Force.

BACKGROUND OF THE INVENTION

The invention presented herein relates to securing of boron filaments to each other and/or to a substrate and is particularly useful in the fabrication of boron-filament-containing tools for grinding, cutting, abrading or the like. Boron filaments as presently available are thin filaments or fibers of substantially elemental boron typically produced by depositing the boron of crystalline form on a fine tungsten core wire, the latter being a device for support during manufacture and while present in the filament does not enter into the cutting characteristics of the boron. The filaments or fibers are useful in cutting tool structures as a result of their super-high hardness and internal structure which allows them to fracture along lattice planes to always present a sharp edge at the filament tips.

Aside from the characteristic of wearing during cutting or abrading so as to continuously present a sharpened tip end, the boron filaments are sufficiently brittle to require adequate side support in order to prevent a too-rapid wear-away when cutting. The most desired arrangement places the adjacently disposed filaments in substantial side-by-side axial parallelism to present an "end on" array of closely spaced sharp filament ends at the working surface of a tool made therefrom. It has been found, however, that difficulties arise in attempting to provide a suitable matrix that is compatible with, that is, will attach itself to without degrading, the boron yet yields the requisite support suitable for tooling use. Prior to the herein disclosed development, making of boron-filament-containing cutting tools was directed primarily to the use of materials or combinations of them other than as herein presented and use of conventional powder metallurgy (i.e., other than as taught herein) or hot pressing in attempting to satisfactorily join or adhere boron filaments to themselves and to substrates in order to fabricate tool materials and shapes.

The disadvantages of such other methods and materials are several: Most cutting tools need high hardness only at the cutting surface, yet for some tool constructions where this surface is a narrow edge, use of older methods requires that considerable extra quantities of boron be chopped and placed in the tool body — an extra expense and complication — since known matrices were inadequate to otherwise produce the toughness and strength with preservation of filament integrity needed for some tool applications, e.g., where high compressive strength, or resistance to shear or bending forces are required. Also, prior materials and methods frequently resulted in excessive filament-to-matrix voids which contribute to low strength characteristics of the resultant filament/matrix or filament/matrix/substrate to defy the fabrication of thin wall shapes such as core drills. Further, with many matrices and materials high sintering temperatures and extended heating times deteriorate the boron filaments with resulting loss to their cutting and abrading properties. Still other difficulties have been encountered heretofore in getting the boron filament volume percentages high, when desirable, in the absence of a full liquid reaction type mixing of the matrix materials. It has also been found that boron-filament-containing tools and materials made under the prior powder metallurgy tend to have fairly low resistance to high impact loads which may be encountered in some machine or other tool applications so that there has been a need for a suitable matrix having the qualities of high strength and toughness which can encase and/or adhere the filaments into a satisfactory unitary structure in order to properly support and preserve the filaments and overcome the problems set forth above.

SUMMARY OF THE INVENTION

The present invention identifies and substantially overcomes the above-indicated disadvantages of the prior art by providing tough, high strength alloy matrix materials and methods for adhering a high volume percentage of boron filaments to themselves and/or to substrate materials so as to produce the requisite support for the filaments without degrading their desirable cutting and abrading properties. As used herein cutting will be generally inclusive of cutting, abrading, grinding, polishing, honing, or the like.

Accordingly it has been found that an alloy mixture or composition essentially consisting of copper, tin and titanium when heated and held at liquid phase sintering temperature for short periods, provides method and materials for a modified brazing effective to join materials including boron filaments by the resulting alloy metal matrix. The composition achieves excellent "sheeting" over and adherence to the boron filaments and to other materials during the sintering which effectively alloys the composition and bonds the filaments firmly supported thereby alone or on a substrate. Upon completion of the liquid phase sintering by cooling, the metal constituents are alloyed to full end use condition. In the case of binding together of boron filaments the result is to firmly encase and hold the filaments side by side in substantially undegraded cutting condition within a matrix material having the requisite strength and toughness to provide the needed support, resistance to impact and compression forces, and wearing qualities which makes their use practical in or as a wide variety of tools or the like, particularly for cutting of very hard materials.

Liquid phase sintering as used herein is defined as a sintering process in which at least one of the phases (the constituent metals) is liquified. The filaments can be provided in the matrix only or held thereby to a separate substrate material, for example, one forming a portion of a tool body such as a supporting form, a shank or spindle or the like to provide for cutting all of the hardest known substances except diamond.

Advantageously the composition of the invention is prepared from an intimate mixing of the copper, tin and titanium, each in metallic powder form and formulated to a flowable liquid-like condition for easy handling and applying to the filaments and/or substrate which are then subjected to the heating and liquid phase sintering. The invention thus contemplates incorporating the metals mixture into a liquid based metal slip or slurry formulation for coating the metals mixture on the filament followed by drying and solidifying the slip coated filaments for rapid, economic assembly of tools or their cutting portions therefrom. Upon liquid phase sintering the metals mixture rapidly "wets" the filaments and the metals are quickly alloyed and bonded into intimate securing contact about the filaments or may be used to braze together various other materials.

In accordance with the invention the alloy forming the matrix material is produced from the metals in substantially elemental or metallic form as a mixture thereof containing between about 60% to about 75% copper by weight of the mixture, tin in an amount of between about 20% to about 35% by weight of the mixture, the remainder being essentially titanium in an amount of between about 3% to about 15% by weight of the mixture. The composition surprisingly has been found, when heated and liquid phase sintered, to provide a highly desirable relatively low temperature "melt" of the matrix materials, with or without the boron filaments, effective to produce the needed low cost and efficient coating and binding of the filaments into a resulting solid matrix which holds them together or the compatible substrates, for example, body materials such as those based on steel, nickel and titanium. The combination of materials gains in the alloy enhanced strength and toughness characteristics exceeding those of the individual metals or the same metals otherwise combined and processed.

In the liquid phase sintering process herein the temperature of the lowest melting point metal constituent (Sn) is raised to or somewhat above its melting point in the metals mixture or combination, in the range of about 1500° F. to about 1650° F. has been found to yield good results, but in any event below the melting points of either the copper or titanium alone or in the combination for a brief time span, advantageously about a period of three minutes, followed by cooling. Only a partial total liquification of the alloy metals results in that the tin constituent or phase is substantially melted and liquified while the copper and titanium remain in the solid phase suspended in the tin during alloying. Upon cooling, the thus sintered metals form a strong, tough, wear resistant alloy of the three constituent metals with the filaments firmly held together thereby and to the substrate, if any, and substantially without voids in the contact of the resulting matrix with the filaments or substrate.

When the metals mixture of Cu-Sn-Ti is formulated as a liquid based flowable metal slip handling of the mixture and coating of the boron filaments therewith is facilitated for efficient production of tools, for example. A proportion of about 4 parts by weight of the mixture to about 1 part by weight of about a 1% solution in liquid of a suitable suspension agent for holding the metals suspended in the solution has been found a good formulation to transfer a very high quantity of the metals with good wet adherence to the filaments and substrate. Advantageously the suspension agent is removable during processing as by volatilizing during heating and a hydrocolloid suspension agent has been found highly beneficial. This slip can then be coated onto the filaments by dipping, or otherwise applied thereto, followed by stacking or otherwise collocating the filaments together in a bundle or on a substrate. Thus coated and associated the boron filaments and/or substrate are dried and then furnace heated under a non-oxidizing protective environment to the selected liquid phase sintering temperature, followed by cooling in a like environment. Excellent alloying or modified brazing results. Where the filaments are used, they are firmly bonded in the alloy undegraded with the resulting alloy/filament mix ready for its cutting or structural end use.

One object of the present invention is to provide a process for assembling boron filament composite tool bodies having ultra-high hardness and high tensile strength properties.

Another object is to provide for fabrication of tools with one or more zones of high boron filament content the ultra-high hardness of which makes for very wear resistant tools.

Still another object is to provide a fabrication technique and material for cutting boron composites whose very high hardness precludes using other tooling materials for cutting it to close dimensions except those containing diamonds.

A further object is to provide a method of fabricating thin-wall annular drills for boron composites, etc., with excellent wear resistance and tool life yet low in cost.

Yet another object is to provide a method of fabricating saws and lathe and milling machine and other tools from low cost steels with ultra-high hardness boron rich areas on the cutting faces.

An additional object is to provide a method of upgrading the wear resistance and useful life of tools subject to abrasion conditions such as earthmoving equipment, oil well drills, and the like by adding a localized boron rich area to the cutting edges.

A still further object is to provide a new alloy combination for use in a modified type of brazing of titanium, steel and nickel as well as boron.

The above and further features and objects of the invention will be more apparent to those skilled in the art upon consideration of the following detailed description and drawings, given by way of example only when taken in light of the foregoing and the appended claims.

BRIEF DESCRIPTION OF THE DRAWINGS

FIG. 6 is a view in perspective of a lathe tool blank showing steps in making a completed lathe tool;

FIG. 7 is a view in perspective of a completed lathe tool made in accordance with FIG. 6 after dressing to shape;

FIG. 8 is a cross-sectional view of a mold showing placement of coated boron filaments therein to make a tool having the filaments concentrated at one end, the rest of the tool being essentially of the matrix material bonding the filaments;

FIG. 9 is a cross-sectional view similar to FIG. 8 showing the further step of filling the mold with additional matrix material; and FIG. 10 is a perspective view of the completed tool after liquid phase sintering and removal of the mold.

DESCRIPTION OF THE PREFERRED EMBODIMENTS

Figure 1:
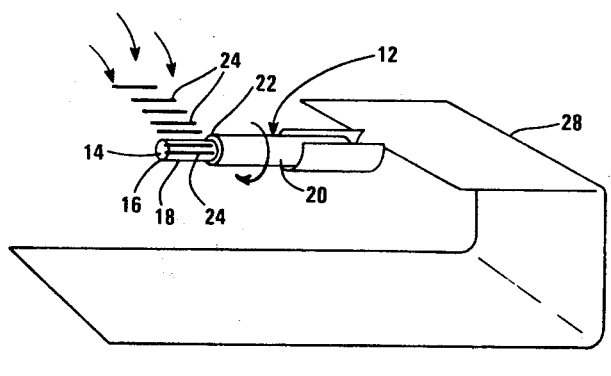
FIG. 1 is a diagrammatic view in perspective showing apparatus and process for fabricating boron-filament-containing thin-walled annular core drills by affixing the filaments to a rod-like substrate in accordance with the invention.
Figure 2:
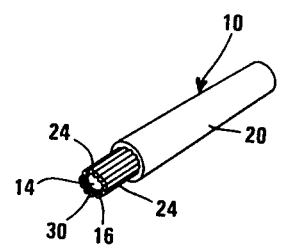
FIG. 2 is a view in perspective of a completed core drill showing the boron filaments at the cutting or drilling end.
Figure 3:
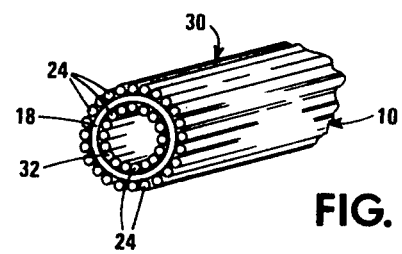
FIG. 3 is a partial view in perspective of an alternate embodiment of a core drill.

Referring to the drawings, FIGS. 1, 2 and 3 show in schematic depiction the making of a thin-wall annular or core drill 10 in accordance with a process of this invention as follows and which were proven by successful performance testing in drilling boron and graphite composite materials. A core drill rod form 12 is first provided in the form of a short length of straight steel tubing to one end of which boron filaments precoated with the metals mixture of this invention may be adhered and the assembly liquid phase sintered to alloy the coating metals so as to hold the filaments in a matrix of the alloyed metals in place. Alternatively the form 12, as depicted, is prepared by drilling a recess 14 into one end of a metal rod of suitable diameter and then machining down the rod around the recess to produce in the final tool a hollow cylindrical cutting end 16 having a reduced portion 18 of lesser outer diameter than a remaining shank portion 20. Form 12 also can be fabricated by first undercutting one end of the steel tube or a solid rod to narrower diameter followed by drilling out a recess in the case of the solid rod. In a preferred embodiment a tube swaged down at one end provides a reduced diameter portion at lower cost. Using the resulting shelf 22 as a positioning guide and support, boron filaments 24, after precutting to iniform lengths and dipping or otherwise coating them with the metals mixture of this invention, are applied to portion 18 by hand positioning or by automated cascading from a hopper or extruder (not shown) where the filaments receive their coating.

The rod form 12 is rotated supported in the trough of fixture 28 so that the filaments are placed substantially axially parallel to the axis of form 12 and to each other as a cylindrical outer annulus 20 about the outer circumference of reduced portion 18 which acts as a substrate to support and hold the filaments. In a highly effective alternate embodiment coated filaments are also applied in a like arrangement as an inner annulus 32 on the interior of the recessed cutting end thus providing inner and outer cylinders of the filaments each presenting a ring-like array of filament ends on opposite sides of the intermediate supporting cylindrical end 16 to provide a good core-cutting action.

The filaments are effectively precoated with the metals mixture by formulating it into a water based slip or slurry which is applied wet to the filaments and the wet, coated filaments placed on the cutting end 16 spaced apart from about 0.003 inch to about 0.008 inch which has been found to provide a good volume of filaments to their encasing matrix for effective cutting. Afterwards the coated filaments are air dried on the substrate for about five minutes causing them effectively to cohere and adhere to the form 12. Sufficient "green" strength results to cause the filaments to remain in place during transfer of the form and filaments to a furnace (not shown) where the drill 10 is completed by liquid phase sintering therein under an inert atmosphere. Advantageously, cylindrical inner and outer rings of combustible or water absorbent mold materials (not shown) may be used as temporary formers for maintaining the filaments in place during drying and/or transport and the liquid phase sintering during or after which any formers may be removed to leave only the completed drill or other tool, tool bit or the like.

Figure 4:
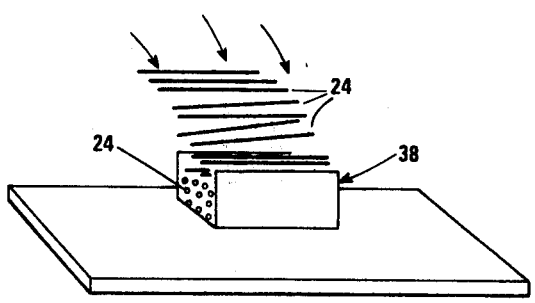
FIG. 4 is a diagrammatic sketch showing apparatus and method for fabricating tool bodies or materials containing the boron filaments throughout.
Figure 5:
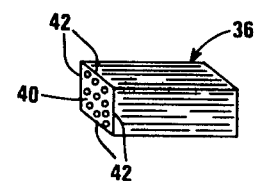
FIG. 5 is a view in perspective of a tool body or material made according to apparatus and process of FIG. 4.

Boron filaments precoated with the metals mixture may also be adhered one to the other in substantial axial parallelism to make a tool or tool blank 36 without use of a separate substrate as indicated in FIGS. 4 and 5. There the precoated filaments are cascaded or otherwise deposited substantially in parallel alignment into a supporting and shaping fixture or jig 38 where they may be temporarily adhered together as, for example, by minimal pressure applied by a forming or compaction tool (not shown) and the mass of cohered coated filaments air dried and then transferred to a furnace for liquid phase sintering. Bonding together of the filaments results to produce a tool body or blank having a cutting face 40 bordered by cutting edges 42. Blank 36 may be itself utilized as a tool, for example, on the rim or face of an abrading wheel (not shown) or held in a chuck or other clamp device (not shown) and applied directly to a workpiece to be cut, ground, polished, honed or otherwise abraded.

In a further embodiment as seen in FIGS. 6 and 7 a lathe tool or other tool 46 may be fabricated to incorporate the boron filaments by using a precut tool shape of steel or other compatible common tool material represented at 48 as a substrate to which the boron filament having been previously sheared to length and precoated with the slip material containing the metals mixture may be applied. Shape 48 has been rabbeted to provide cut-out area 50 over a filament supporting tongue 5 that extends axially from a filament supporting and positioning abutment 54 at the main body of the shape for receiving the filaments. The precut and precoated filaments may be cascaded or otherwise laid or stacked onto tongue 50 in substantially axial parallelism one end against the abutment 52 as a localized area rich in boron filaments for cutting. A surrounding wall or former (not shown) may be used to further contain and shape the mass of coated filaments or they can be formed by hand. Following liquid phase sintering as taught herein the slip material metals bond the filaments to one another and to the substrate which may then be dressed as by use of a diamond saw or shear (neither shown) as indicated in FIG. 7 where a corner has been thus cut off to form the resulting pointed lathe tool or lathe tool bit 46 Such tools either with or without such dressing to special configuration may be used, for example, in the teeth of earth moving equipment or other tools where a localized hard cutting face or edge is required. Also, in place of the alignment of the filaments substantially parallel with the axis of the tool shape the filaments may be arranged normal thereto or at any suitable angle, e.g. stacked vertically on the tongue 52, depending on the direction in which the exposed filament ends should extend to effect the cutting action desired.

Tools or tool inserts also may be made which have only localized areas of the boron filaments without use of the heretofore indicated substrates of materials differing from the matrix alloy. Such a method is indicated FIGS. 8, 9 and 10 in which the boron filaments 24 a precoated with the metals mixture as taught herein are thereafter deposited in generally parallel alignment in the base of a cavity 60 in a water absorbent destructible or otherwise removable mold 62. The cavity is the filled with the slip or slip material 64 containing the metals mixture in the manner of slip casting and the resulting entire assemblage air dried followed by placing it in a furnace (not shown) and heating to remo volatiles and brought to the liquid phase sintering temperature for the times desired. After cooling for the necessary period to complete or fix the alloying without degrading, the mold is removed to leave a completed tool or tool insert 66 having a boron filament rich cutting section 68. Ends of the mass of filaments at the insert cutting tip are directed outward with the lengths of the filaments firmly supported only by the surrounding matrix of the alloyed metals from the mixture and may be directly applied to a workpiece, that is, whatever material is to be cut or abraded. Section 68 is thus seen integrally attached to the supporting shank section 70 made up only of the alloyed matrix material which economy of filaments effects a useful cost saving. In some cases it may be beneficial to provide some of the boron filaments paralleled side by side axially in the shank section 70 as, but having a lesser volume than, cutting section 68 to provide the tool or insert with overall exhanced strength qualities, for example, with increased greater modulus.

In making the alloy providing the matrix material of the present invention a mixture of metals in finally divided elemental or metallic powder form of a mixture of copper, tin and titanium was prepared. Useful particle sizes for the metals are mixtures of particle or powder sizes ranging from about −100 to about −325 mesh or finer. In general, the larger the particle size the less the "green" strength of the slip. The powdered metals were incorporated in a water based slip so as to provide good suspension and sufficient flowability of a high volume of the metals mixture for fast, easy coating of the filaments or otherwise handling the same. Good results are obtainable when the metals mixture is prepared from a combination consisting essentially of copper in an amount between about 60% to about 75% by weight of the mixture, tin in an amount between about 20% to about 35% by weight of the mixture and titanium in an amount between about 3% to about 15% by weight and about 4 parts by weight of the such mixture added to about 1 part by weight of about a ½% to about a 1% solution in water of a hydro-colloid suspension agent for the metals.

A hydro-colloid advantageously used in the present invention is a sodium salt of alginic acid and is commercially available under the name "Keltex" which is a trademark of the Kelco Company having offices at San Diego, Calif. In appropriate cases other suitable natural hydro-colloids, for example, guar gum may also be used as a suspension agent to hold the metals suspended.

Excellent results in accordance with the invention have been obtained using a formulation in which the metals are combined as a mixture in which the copper is present in an amount of about 68%, tin is present in an amount of about 25% and the remainder being substantially titanium in an amount of about 7%, all by weight of the mixture, and the mixture blended as about 4 parts by weight of the mixture to about 1 part by weight of about a 1% water solution of the sodium salt of alginic acid suspension agent. The formulation of matrix metals or matrix base is coated onto the filaments which are the collocated or massed together in a desired shape or bundle of parallel coated fibers either alone or with additional matrix base adjoined thereto or on a substrate and the whole subjected to drying, heating and liquid phase sintering. In the resulting structure the filaments are solidly held closely spaced apart in and by the alloyed matrix metals essentially undegraded ready to use in or as a tool, tool blank or insert which can be completed if necessary by additional simple operations such as dressing to shape or inserting in a tool or holder.

When the metals mixture is applied by the liquid formulations referred to, air drying for about five minutes prior to initial heating has been found effective to consolidate the metals on the filaments and/or substrate at the same time reducing the volatiles content and facilitating handling. In some cases, immediate furnace heating can be undergone, however. The materials are placed in a protective environment, advantageously an inert gas atmosphere, e.g., argon, or a high order of vacuum for protecting the materials from undesired chemical changes or degradation, and heat applied, as in a furnace filled with the gas or in some cases a reducing atmosphere. The temperature is preliminarily raised to a level sufficient to drive off volatiles but below liquid phase sintering temperature. A period of from about 1 to about 2 minutes is generally sufficient but may be varied. Thereafter the temperature is raised to a range of from about 1500° F. to about 1650° F. in which the liquid phase sintering occurs. Such temperature is maintained for from about 1 to about 6 minutes providing for full interaction of the metals and the wetting and flowing or sheeting over by the composition of the parts to be joined or bonded, e.g., the boron filaments or other materials being so brazed together or with the filaments or both. Thereafter reducing the temperature cools the materials which halts the liquid phase sintering or modified brazing. Advantageously cooling is conducted in a protective environment for a period sufficient to solidify the liquid phase of the matrix material in order to protect the alloying from contamination such as oxidation. Particularly good results have been obtained when the preheating of the metals mixture is accomplished over a period of about 1½ minutes up to a liquid phase sintering temperature of about 1500° F. which is then maintained for about 1½ minutes followed by the cooling to complete the alloy and full solidification of the matrix. The boron filaments were found to be preserved without detected deterioration securely held in the matrix and provided good cutting in the case of a core drill, for example, without dislodgment or too rapid wear-away of the filaments or matrix when used for drilling of boron and graphite composite materials.

It will be appreciated that the mixture when heated to liquid phase sintering temperature produces a quasi-liquid diffusion type of sinter bonding operation facilitating placement of the hard boron only in those areas of a tool where it needed. Filaments may thus be concentrated in one or more cutting zones at a cutting edge of tool, e.g., the teeth area of a steel saw blade. As partly indicated above, materials to which the present alloy will attach by the bonding or modified brazing herein include copper, nickel, cobalt, iron, titanium and their alloys.

It will be evident that the alloying of the tin phase or fraction to the copper and titanium fractions herein does not extend to metallurgical equilibrium. Nor is this believed to occur for the copper or titanium since in the process herein the equilibrium melting temperatures of these elements in such combinations would exceed that which tends to degrade or destroy the high hardness crystallographic fracture plane structure of the boron filaments.

The good sheeting action, believed induced by the reaction with the titanium, provides for full surface wetting and a close boron filament interspacing for a high volume percent of the filaments in the resulting strong matrix material. For example, using boron filament sizes of from about 0.004 inches diameter to about 0.012 inches diameter good cutting surfaces or areas have been obtained with a filament content in the resulting product of up to about 50 percent by volume. Spacing of the filaments is, of course, variable depending on filament density in the matrix. The titanium addition also appears to assist in a rapid liquification action of the composition which is found to have a beneficial sluggish flow over a range of temperature which minimizes any "balling", "dripping", "excessive flow" or the like. Probably, the tin of the alloy mixture provides the low melting/slushing temperature in the liquid phase sintering or bonding herein.

While all details of the mechanism and extent of the bonding action of the constituent phases of the mixture to each other, to the boron filaments or to substrate materials are not fully understood, it is believed that a ternary alloy of the tin, copper, and titanium is formed by rapid diffusion between the liquid tin and the solid copper and titanium fractions during the liquid phase sintering operation. A metallurgical reaction is believed also to occur between the tin rich alloy and the boron and/or compatible substrate, if any, which strongly affixes the boron filaments in the resultant alloy. Some direct sintering of the copper to the titanium probably also occurs. Also potential contaminants such as from residue or reaction products from the suspension agent which might tend to weaken the bonding or cause voids are reduced or eliminated probably due to the heating before reaching liquid phase sintering temperatures. However, the various theories herein are not fully verified.

In some cases, liquid or liquidizing substances other than or in addition to the water disclosed herein as the liquid vehicle of the referred to slip formulation for the modified brazing herein can be used, water being preferred due to the good results achieved.

It will be appreciated that the boron filaments dipped in the Cu-Sn-Ti slip may be applied to a variety of tool geometrics, e.g., lathe tool point areas, milling machine cutter surfaces, oil well drill ends, earthmoving tool edges, and others. The wet application of the filaments also can readily be mechanized.

As thus described, the process herein for fabricating cutting tools is characterized by a unique matrix alloy combination of metals that (1) forms a sluggish liquid at a low temperature, (2) wets and adheres in an excellent fashion to boron filaments and also to steel and other materials, (3) does not embrittle or otherwise deteriorate the boron filaments themselves, and (4) has the toughness and strength required to serve as a supporting matrix material for super high hardness filaments or fibers in the cutting of other high hardness materials such as boron, cutting carbides such as Carborundum, and others.

Various modifications may be made by those skilled in the art without departing from the spirit and scope of the invention.

What is claimed is:

1. A liquid-phase-sintered alloy for secure attachment of boron filaments to other like filaments and to metallic substrate materials so as generally to encase and fix the filaments in a tough, solid supporting alloyed metals matrix capable of maintaining the integrity of the boron filaments which consists essentially of:
    (A.) metallic copper in an amount of between about 60% to about 75% copper by weight of the alloy;
    (B.) metallic tin in an amount of between about 20% to about 35% by weight of the alloy; and
    (C.) the remainder being essentially metallic titanium in an amount of between about 3% to about 15% by weight of the alloy;
    the copper, tin and titanium being alloyed from powder form by a liquid-phase-sintering whereby the copper and titanium remain substantially unliquified.

2. The liquid-phase-sintered alloy of claim 1 in which said liquid-phase-sintering is carried out at temperatures in the range of from about 1500° F. to about 1650° F. for from about 1 to about 6 minutes.

3. A composition of matter having therein intact boron filaments surrounded along their lengths by a metal alloy to produce a boron-filament-containing tool structure comprising:
    A. a plurality of generally closely spaced apart boron filaments for presenting an array of sharp filament ends at a working surface of the tool;
    B. said filaments substantially encased in a liquid-phase-sintered metallic matrix material consisting essentially of:
        (1) metallic copper in an amount between about 60% to about 75% by weight of the mixture,
        (2) metallic tin in an amount between about 20% to about 35% by weight of the mixture, and
        (3) the remainder being substantially titanium in an amount of between about 3% to about 15% by weight of the mixture;
    said copper-tin-titanium mixture being alloyed about said filaments by liquid phase sintering during which the copper and titanium remain substantially unliquified to produce a composition of matter wherein the filaments are firmly held substantially undegraded in a strong, tough metallic matrix material effective to support the filaments in an end-on array of the filament ends for cutting, grinding or abrading tool operations.

4. The boron-filament-containing composition of matter of claim 3 in which said filaments are collocated in substantially axial parallelism one to another and distributed substantially throughout the working surface of the tool.

5. The boron-filament-containing composition of matter of claim 3 in which the filaments are bonded by said matrix material to a supporting substrate.

6. The boron-filament-containing composition of matter of claim 3 in which the filaments are in substantial axial parallelism in a cylinder-like arrangement upon a supporting substrate, said matrix bonding the filaments to each other and to said substrate.

7. The boron-filament-containing composition of matter of claim 3 in which the filaments are arranged in groups of filaments positioned on opposite sides of a portion of said substrate the latter supporting and separating said groups of filaments.

8. The boron-filament-containing composition of matter of claim 7 in which said groups of filaments are each cylinder-like configurations.

9. The boron-filament-containing composition of matter of claim 3 in which said filaments are spaced apart by from about 0.003 inches to about 0.008 inches 10. The composition of matter of claim 3 in which said metallic matrix material has been liquid-phase-sintered at temperatures in the range from about 1500° F to about 1650° F. for from about 1 to about 6 minutes

* * * * *